(12) United States Patent
Cheng et al.

(10) Patent No.: US 12,075,800 B2
(45) Date of Patent: Sep. 3, 2024

(54) DIE-PRESSING PRODUCTION DEVICE AND METHOD FOR FLAVORED DRIED BEAN CURD

(71) Applicant: Jiangnan University, Wuxi (CN)

(72) Inventors: Feng Cheng, Wuxi (CN); Zhigang Ma, Wuxi (CN); Weixi Ji, Wuxi (CN); Feihu Song, Wuxi (CN)

(73) Assignee: Jiangnan University, Wuxi (CN)

( * ) Notice: Subject to any disclaimer, the term of this patent is extended or adjusted under 35 U.S.C. 154(b) by 337 days.

(21) Appl. No.: 17/770,930

(22) PCT Filed: May 19, 2021

(86) PCT No.: PCT/CN2021/094520
§ 371 (c)(1),
(2) Date: Apr. 21, 2022

(87) PCT Pub. No.: WO2022/052504
PCT Pub. Date: Mar. 17, 2022

(65) Prior Publication Data
US 2023/0122441 A1 Apr. 20, 2023

(30) Foreign Application Priority Data
Sep. 9, 2020 (CN) .......................... 202010939647.6

(51) Int. Cl.
*B30B 9/06* (2006.01)
*B30B 9/26* (2006.01)
(Continued)

(52) U.S. Cl.
CPC ............... *A23L 11/45* (2021.01); *A23P 30/10* (2016.08); *B08B 3/123* (2013.01); *B30B 9/06* (2013.01); *B30B 9/24* (2013.01); *B30B 9/265* (2013.01)

(58) Field of Classification Search
CPC .. B30B 5/04; B30B 5/06; B30B 5/062; B30B 9/06; B30B 9/22; B30B 9/24;
(Continued)

(56) References Cited

U.S. PATENT DOCUMENTS 544,670 A * 8/1895 Ingison .................... B30B 9/06
100/151
692,228 A * 2/1902 Bender .................... B30B 9/06
100/222

FOREIGN PATENT DOCUMENTS

CN 203313996 U 12/2013
CN 104621269 A 5/2015
(Continued)

OTHER PUBLICATIONS

Title of the article: Non-official transation:Specialties of Jieshou:Five-Spice Dried Beancurd Publication date: Apr. 1, 1986 name of the author: Xinqiang Hu et al. title of the item:Shanghai Agricultural Science.

*Primary Examiner* — Jimmy T Nguyen
(74) *Attorney, Agent, or Firm* — Nitin Kaushik

(57) ABSTRACT

The present disclosure relates to a die-pressing production device and method for flavored dried bean curd. The die-pressing production device includes a die-pressing apparatus and an intermittent fabric operation apparatus located on a side of the die-pressing apparatus; the die-pressing apparatus includes a frame body on which two parallel wrapping mechanisms for wrapping a to-be-pressed material are disposed, and a cover plate for downwards pressing the wrapping mechanisms and a jacking plate for upwards jacking the wrapping mechanisms are respectively disposed on the top and bottom of the frame body; and the intermittent fabric operation apparatus includes a rack and a roller set disposed on the rack, and the roller set is wound with a rotary fabric (Continued)

belt passing through a space between the two wrapping mechanisms.

9 Claims, 11 Drawing Sheets

(51) Int. Cl.
*A23L 11/45* (2021.01)
*A23P 30/10* (2016.01)
*B08B 3/12* (2006.01)
*B30B 9/24* (2006.01)

(58) Field of Classification Search
CPC ......... B30B 9/241; B30B 9/248; B30B 9/265; B08B 3/123; A23F 3/06; A23L 11/45; A23P 30/10
See application file for complete search history.

(56) References Cited

FOREIGN PATENT DOCUMENTS

| | | |
|---|---|---|
| CN | 110356030 A | 10/2019 |
| CN | 211185711 U | 8/2020 |
| CN | 111919922 A | 11/2020 |
| WO | WO-2019030218 A1 * 2/2019 | ........... B30B 9/3003 |

* cited by examiner

US 12,075,800 B2

DIE-PRESSING PRODUCTION DEVICE AND METHOD FOR FLAVORED DRIED BEAN CURD

CROSS-REFERENCE TO RELATED APPLICATIONS

The application claims priority to Chinese patent application No. 2020109396476 filed on Sep. 9, 2020, the entire contents of which are incorporated herein by reference.

TECHNICAL FIELD

The present disclosure relates to the technical field of food forming devices, in particular to a die-pressing production device and method for flavored dried bean curd.

BACKGROUND

Flavored dried bean curd is a unique product derived from dried bean curd, the one which has the peculiar characteristic should be spiced dried bean curd regarded as the number one in Yangzhou area, and the spiced dried bean curd serving as one of non-fermented bean products is affected by the history, geology and folk customs of a production location. Compared with ordinary soybean milk, the flavored dried bean curd is more sophisticated and is higher in processing technical level and represents one of intangible cultural heritages in Yangzhou. With the quickening of urban living paces, increasingly diverse dietary habits appear, which results in higher difficulty in spreading and iterating the flavored dried bean curd.

The production of bean curd is time-honored and epitomizes years of experience, but is immature in theory, no theoretical supports are provided for many technical principles in a production process, people know how to do, but do not know the fundamental principle, which results in difficulty in converting its process into an automatic production line. There is little complete basic research on products derived from bean products and not in popular demands, the technical levels of most of workshops for producing the dried bean curd are very low, flavored dried bean curd manufacturers more depend on their experience and feeling. With the flavored dried bean curd as an example, at present, the conventional production of the dried bean curd mostly adopts manual production, a stepped processing technology is generally adopted, and its technical processes mainly include soaking, grinding, filtering, soybean milk boiling, curdling, forming, squeezing and dicing.

Nowadays, no relatively mature modern production systems have been provided for the bean product industry such as the flavored dried bean curd as comparison with other food industries. Since the flavored dried bean curd serving as a leisure food with unique characteristics is marginalized, the flavored dried bean curd manufacturers cannot get good financing channels in most cases, which results in insufficient fund investment, small production scale and low industrialization level; most of processing personnel working on flavored dried bean curd production are distributed in villages where the production capacity drops behind and the production staff has a relatively low educational level, and therefore, a stable and safe production process cannot be ensured, and the produced bean products are difficult to meet a sanitary standard. Nowadays, with the growth in the living standard of the public, the quantity demand of the leisure food is continuously increasing, and therefore, a set of perfect manufacturing industrial equipment system is urgently needed to support the huge quantity demand of the flavored dried bean curd serving as a conventional food with unique characteristics in China.

SUMMARY

For overcoming defects in the prior art for production, the applicant provides a die-pressing production device and method for flavored dried bean curd. By disposing a fabric belt doing rotary motion, the fabric belt can directly move to a clean segment and drop in a die cavity, and thus, automatic and circular cleaning and usage are achieved. Moreover, in a process of pressing the flavored dried bean curd, the fabric belt may be kept in an appropriate tensioned state, that is, the fabric belt is neither excessively tightened nor excessively untightened, thereby facilitating forming the flavored dried bean curd.

Technical solutions adopted in the present disclosure are described as follows.

A die-pressing production device for flavored dried bean curd, comprising a die-pressing apparatus (1) and an intermittent fabric operation apparatus located on a side of the die-pressing apparatus (1);

wherein the die-pressing apparatus (1) comprises a frame body (7) on which two parallel wrapping mechanisms (3) for wrapping a to-be-pressed material are disposed, and a cover plate (102) for downwards pressing the wrapping mechanisms (3) and a jacking plate (103) for upwards jacking the wrapping mechanisms (3) are respectively disposed on the top and bottom of the frame body (7); and the intermittent fabric operation apparatus comprises a rack (6) and a roller set (2) disposed on the rack (6), and the roller set (2) is wound with a rotary fabric belt (4) passing through a space between the two wrapping mechanisms (3).

Further, wherein the frame body (7) comprises a top plate (701) and a bottom plate (702), upright posts (703) and guide rods (302) are connected between the top plate (701) and the bottom plate (702), and the wrapping mechanisms (3) are connected with the guide rods (302).

Further, wherein the wrapping mechanisms (3) comprise connecting rods (3011) slidably connected with the upright posts (703), wheel rods (3012) used for tensioning the fabric belt (4) is connected between the two connecting rods (3011), and the connecting rods (3011) and the wheel rods (3012) are disposed on the same plane.

Further, wherein fixing heads (3014) connected with the connecting rods (3011) are disposed on two ends of the wheel rods (3012), and the wheel rods (3012) rotate relative to the fixing heads (3014).

Further, wherein the top plate (701) is provided with an upper hydraulic machine (8), an end of an output shaft of the upper hydraulic machine (8) penetrates through the top plate (701) and is connected with the cover plate (102), and the cover plate (102) is connected with the connecting rods (3011).

Further, wherein the bottom plate (702) is provided with a lower hydraulic machine (9), an end of an output shaft of the lower hydraulic machine (9) is provided with the jacking plate (103), and the jacking plate (103) is located below the fabric belt (4).

Further, wherein the bottom plate (702) is further provided with second supporting rods (1203), a die cavity (101) is connected to the tops of the second supporting rods (1203), the die cavity (101) comprises an outer side cover (1202) connected with the second supporting rods (1203) and an inner side cover (1201) placed in the outer side cover (1202), and a motion path of the jacking plate (103) is located in the die cavity (101).

Further, wherein the roller set (2) comprises driving rollers (202) driven by a rotary driving apparatus and driven rollers (201) driven by the fabric belt (4), the rack (6) is further provided with guide rails (601), and the driving rollers (202) or the driven rollers (201) are slidably connected to the insides of the guide rails (601).

Further, wherein a cleaning pool (501) is disposed on the bottom of the rack (6), the fabric belt (4) passes through the cleaning pool (501) and is soaked into the cleaning pool (501), and an ultrasonic generator (502) is disposed on the side wall of the cleaning pool (501).

A production method in which the die-pressing production device for the flavored dried bean curd comprising the following steps:

firstly, preparatory work: tensioning a fabric belt (4) on a roller set (2) and wrapping mechanisms (3);

secondly, specific production process: putting a feeding box (10) between the fabric belt (4) on the wrapping mechanisms (3), and downwards pressing the feeding box (10) to enable the bottom of the feeding box (10) to cover the fabric belt (4) to be inserted to a die cavity (101); pouring soybean milk into the feeding box (10); withdrawing the feeding box (10); pushing, by an upper hydraulic machine (8), a cover plate (102) to downwards move until a die is closed, meanwhile, sliding driving rollers (202) or driven rollers (201) located along the guide rails (601), and adjusting the length of the fabric belt (4) to tension the fabric belt (4); and driving, by a lower hydraulic machine (9), a jacking plate (103) to upwards squeeze the soybean milk until forming to obtain a white body of the flavored dried bean curd;

thirdly, discharging: pushing, by the upper hydraulic machine (8), the cover plate (102) to upwards move to reserving a space for discharge; and pushing, by the lower hydraulic machine (9), the jacking plate (103) to upwards move to jack out the white body of the flavored dried bean curd, thereby obtaining the white body of the flavored dried bean curd;

fourthly, resetting: driving, by the lower hydraulic machine (9), the jacking plate (103) to return to an initial position; after each batch of flavored dried bean curd is produced, uplifting limiting rollers (503) immersed into a cleaning pool (501), and taking out the fabric belt (4) from the cleaning pool (501); wherein during production in the first, second and third steps, the fabric belt (4) is intermittently and circularly driven for one cycle under the action of the roller set (2) every time when a batch of flavored dried bean curd is produced, and an intermittent time period corresponds to a time period that the flavored dried bean curd is pressed;

fifthly, repeating the production processes of the flavored dried bean curd in the second, third and fourth steps; and sixthly, regularly removing the cleaning pool (501), and replacing a cleaning solution.

The present disclosure has the following beneficial effects:

The die-pressing production device is compact and reasonable in structure and convenient to operate. By disposing the fabric belt doing rotary motion, after a white body of a piece of flavored dried bean curd is formed every time, the fabric belt can directly move to a clean segment and drop in the die cavity, and the used part on which residual materials are remained is conveyed with the motion of the roller set to the cleaning pool so as to be cleaned, and thus, automatic and circular cleaning and usage are achieved. The cleaning pool needs to be replaced by manual intervention only when the white body of a batch of flavored dried bean curd is completely produced or a certain working time period is ended, and thus, the ratio of manual operation is greatly reduced.

In the present disclosure, relative positions of the roller set and the rack are not invariable, at least one roller in the roller set may move with the guide rails on the rack according to a specific processing step during feeding/discharging, so that the tensioned state of the fabric belt is always consistent with an expected effect.

DETAILED DESCRIPTION OF THE EMBODIMENTS

The specific implementations of the present disclosure will be described below in conjunction with the accompanying drawings.

Figure 1:
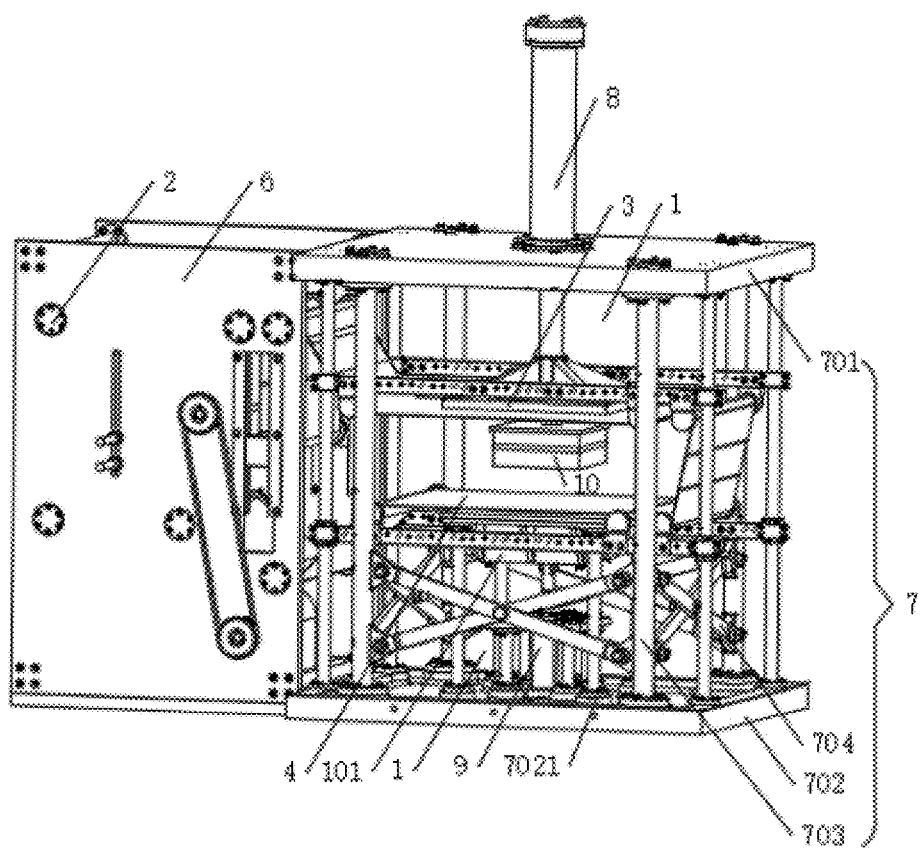
FIG. 1 shows a schematic diagram of an overall structure in accordance with the present disclosure.
Figure 2:
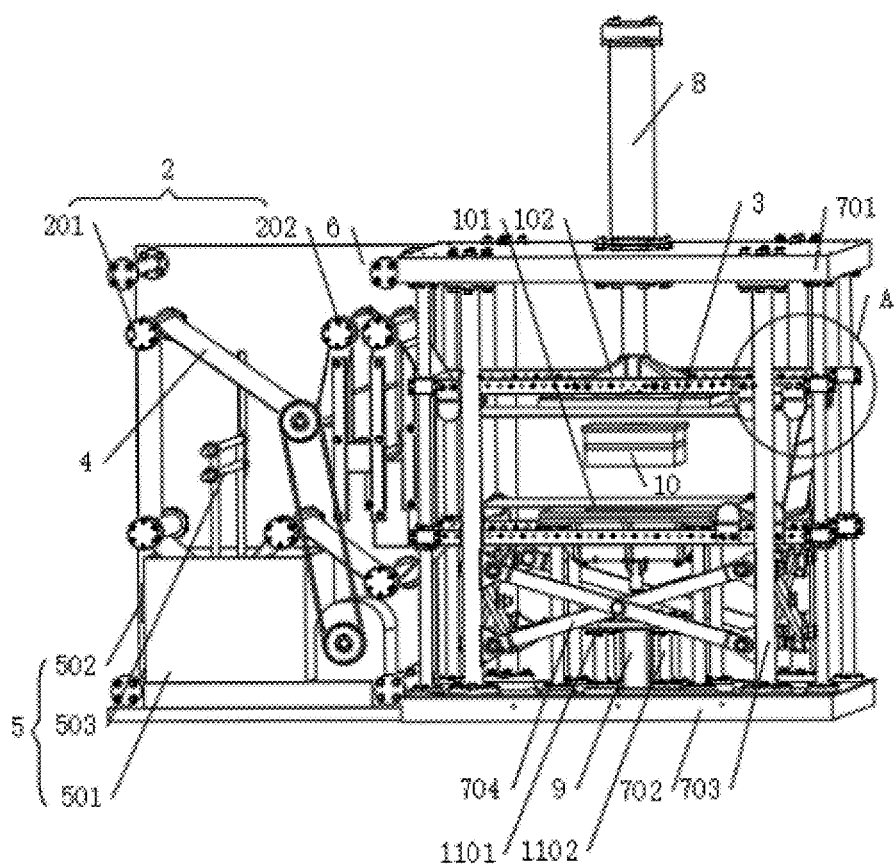
FIG. 2 shows a schematic diagram of a conveying structure of a fabric belt in accordance with the present disclosure.

As shown in FIG. 1 and FIG. 2, a die-pressing production device for flavored dried bean curd in accordance with the present embodiment includes a frame body 7 serving as a device reference, the frame body 7 includes a top plate 701 and a bottom plate 702, both of which are rectangular, four vertices of the top plate 701 and the bottom plate 702 are supported by upright posts 703, and ends of the upright posts 703 are fixedly connected to the top plate 701 and the bottom plate 702 by using screws.

Figure 5:
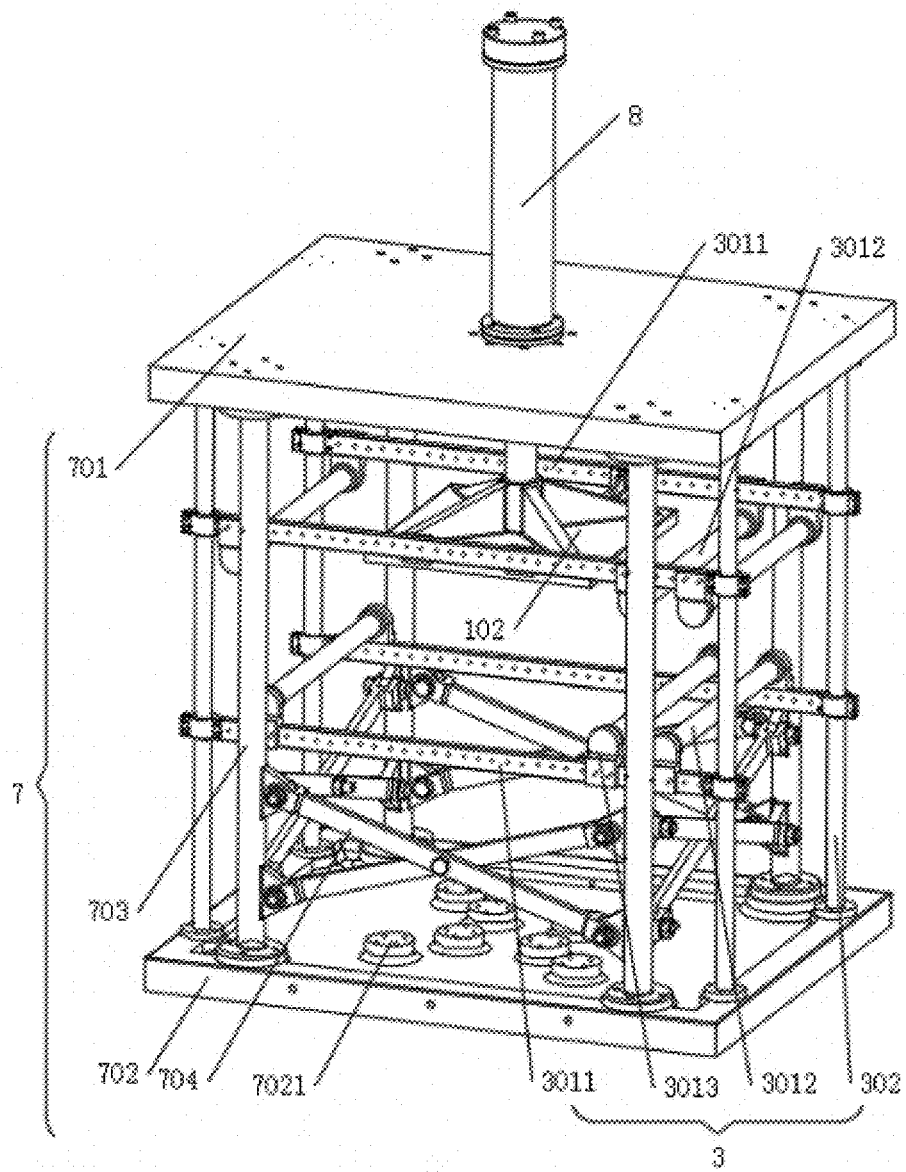
FIG. 5 shows a schematic structural diagram of a frame body in accordance with the present disclosure.
Figure 6:
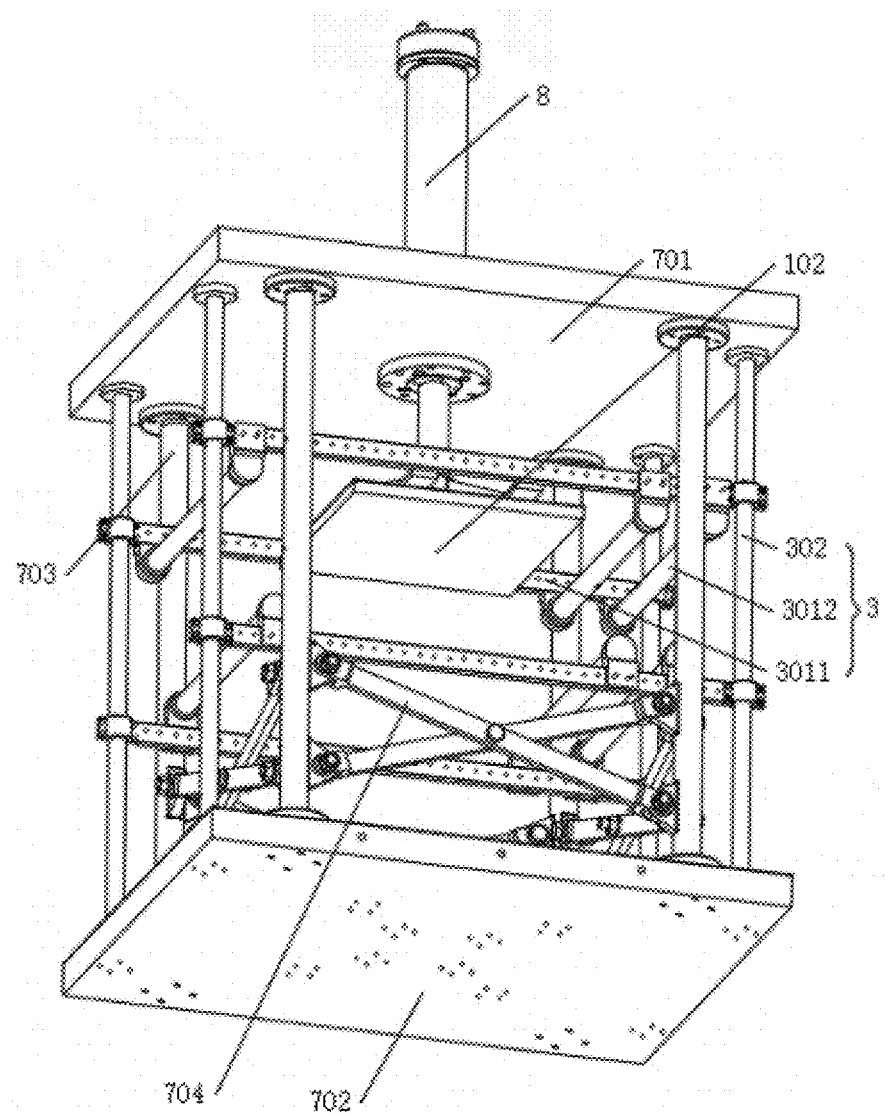
FIG. 6 shows a bottom view of a structure of the frame body in accordance with the present disclosure.

As shown in FIG. 5 and FIG. 6, ribbed rods 704 are further connected between every two adjacent upright posts 703, two ribbed rods 704 are disposed between every two upright posts 703 and are intersected to form a shape like "X", and screws penetrate into intersections, so that the stability is improved. Fixing lugs are led out of the upright posts 703, grooves are formed in ends of the ribbed rods 704, the fixing lugs are embedded into the grooves, and the ribbed rods 704 are fixed in a manner that the screws penetrate through the fixing lugs and walls of the grooves in the ends of the ribbed rods 704. In view of reciprocating motion required on a moving die part in a die-pressing structure, the ribbed rods 704 in the present embodiment are merely disposed on lower half segments of the upright posts 703.

Figure 7:
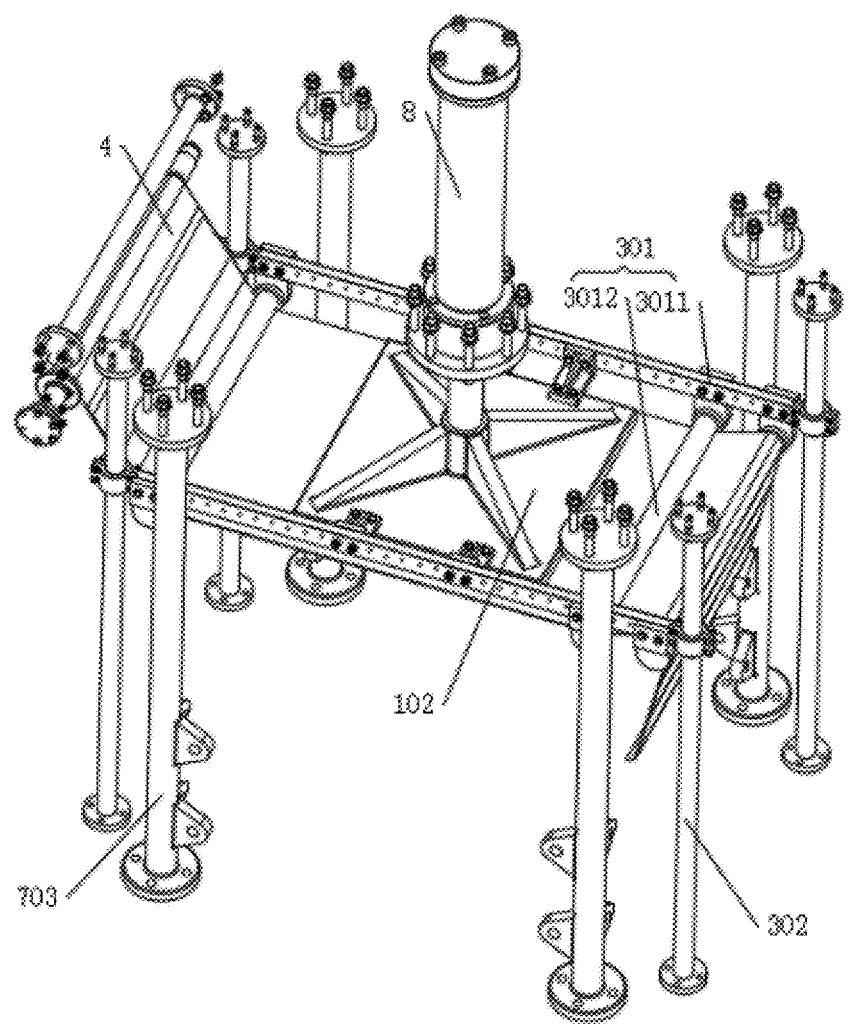
FIG. 7 shows a schematic structural diagram of a relative position among a fabric belt, a wrapping mechanism and a cover plate in accordance with the present disclosure.
Figure 8:
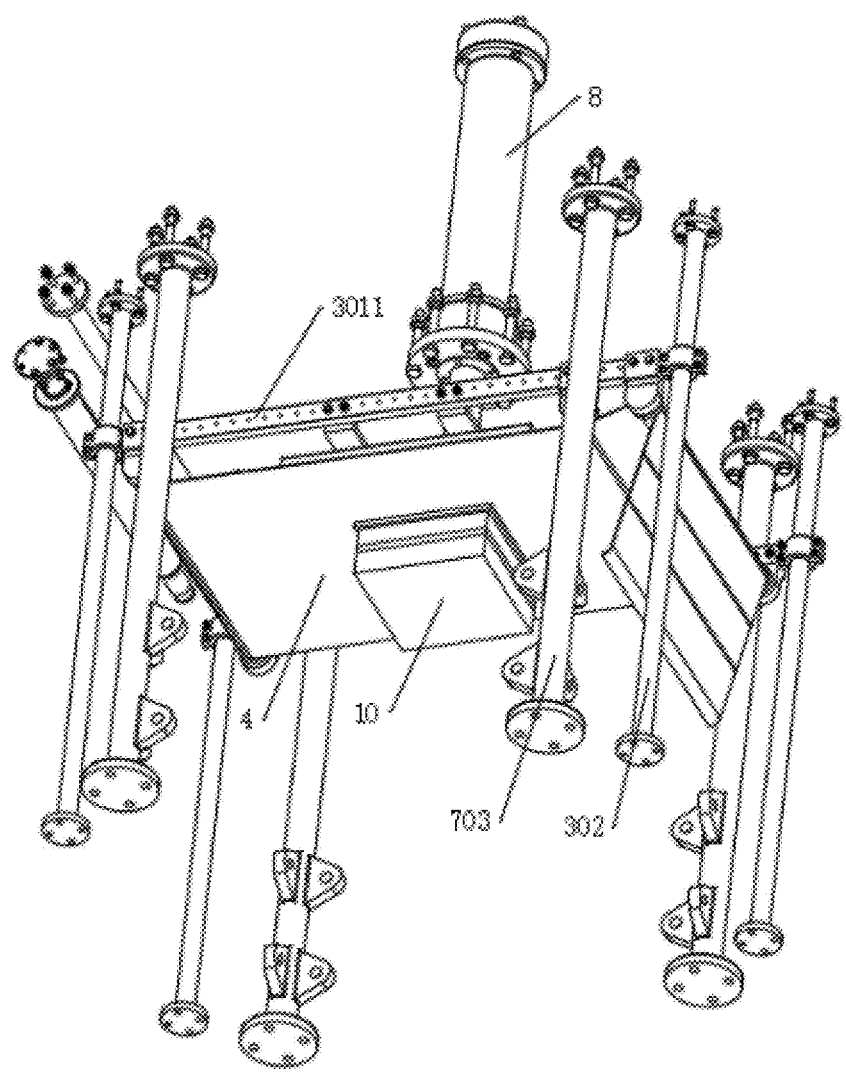
FIG. 8 shows a schematic structural diagram of a feeding box, the fabric belt and the wrapping mechanism in accordance with the present disclosure.

As shown in FIG. 5 and FIG. 6, the top plate 701 is provided with an upper hydraulic machine 8, an output shaft of the upper hydraulic machine 8 penetrates through the top plate 701 and points to the ground, and the output shaft of the upper hydraulic machine 8 is connected with a cover plate 102 which is disposed horizontally. As shown in FIG. 7, several right-triangular stiffening ribs are disposed on the surface, connected with the output shaft of the upper hydraulic machine 8, of the cover plate 102, and two right-triangular ribs of the stiffening ribs are respectively connected with the output shaft of the upper hydraulic machine g and the top surface of the cover plate 102. The bottom surface of the cover plate 102 is used for pressing soybean milk.

Figure 3:
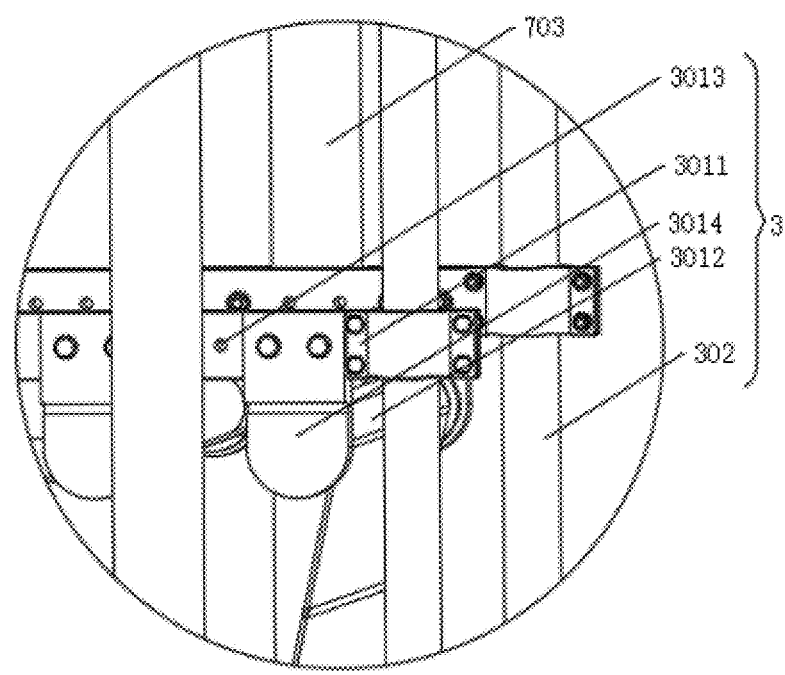
FIG. 3 shows an enlarged view of a part A in FIG. 2 and is used for embodying a structure of a wrapping mechanism.
Figure 4:
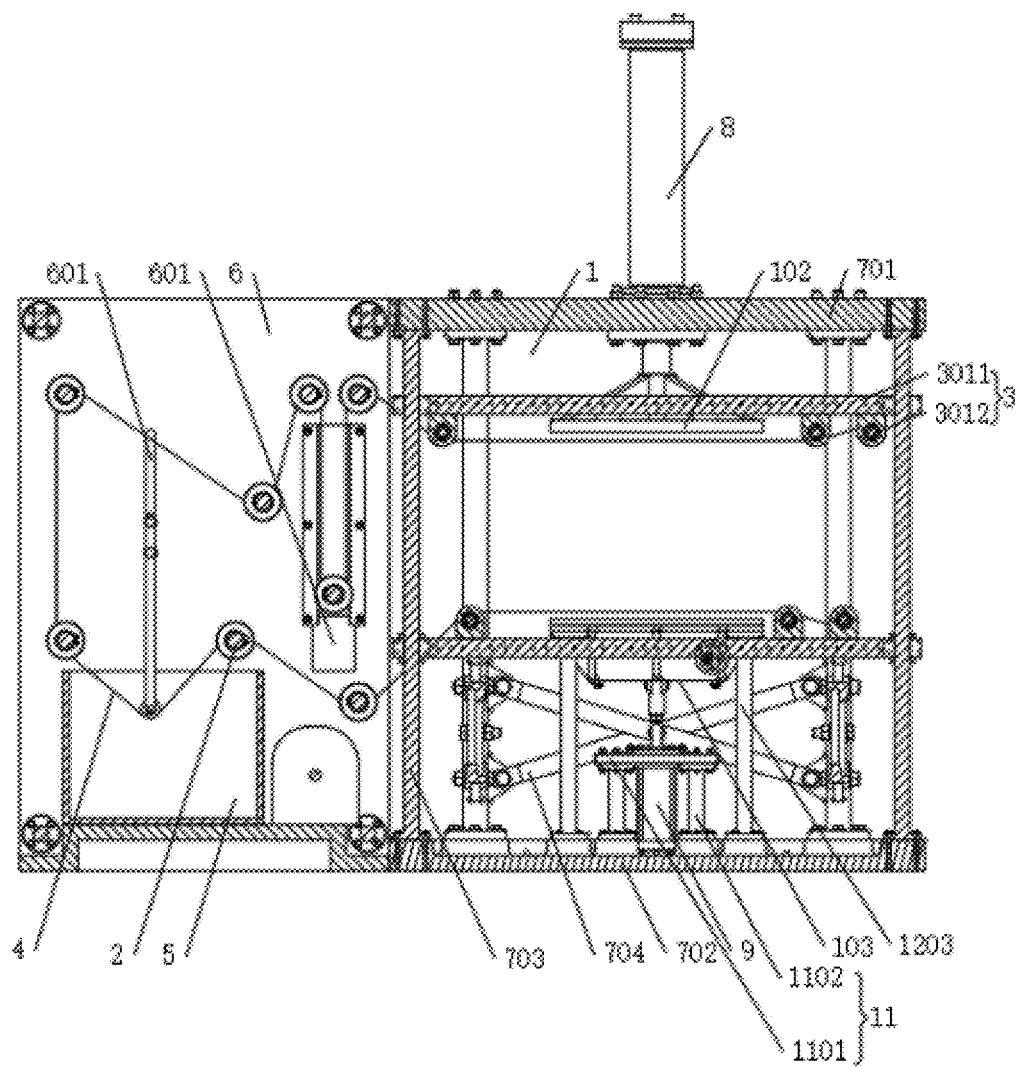
FIG. 4 shows a longitudinal sectional view of a die-pressing production device for flavored dried bean curd in accordance with the present disclosure.

As shown in FIG. 2, FIG. 3 and FIG. 4, wrapping mechanisms 3 are further disposed between the top plate 701 and the bottom plate 702, the wrapping mechanisms 2 include four guide rods 302, and a cubic accommodating space formed by the four guide rods 302 falls in a space formed by the four upright posts 703. The guide rods 302 are slidably connected with the wrapping mechanisms 3, each set of wrapping mechanism 3 includes two connecting rods 3011 disposed on the same plane, the two connecting rods 3011 are located in a horizontal plane, and several wheel rods 3012 are connected between the two connecting rods 3011. In the present embodiment, ends of the connecting rods 3011 are of hoop structures sleeving the guide rods 302; and each set of connecting rods 3011 is connected with three wheel rods 3012, and each wheel rod 3012 is perpendicular to the connecting rods 3011. Two of the wheel rods 3012 are close to each other and are located on one side of the cover plate 102, and the other wheel rod 3012 is located on the other side of the cover plate 102. Moreover, relative positions of the wheel rods 3012 and the connecting rods 3011 are adjustable. The specific adjustable structure is that several connecting holes 3013 are linearly arrayed in the connecting rods 3011, fixing heads 3014 for fixing the wheel rods 3012 to the connecting rods 3011 are disposed on the ends of the wheel rods 3012, connecting holes 3013 are further disposed in the fixing heads 3014, and the fixing heads 3014 may be mounted on designated positions of the connecting rods 3011 by adopting connecting pieces such as screws or cotters. In order to ensure that the frictional resistance of a fabric belt 4 moving on the wheel rods 3012 is small as much as possible, the wheel rods 3012 are connected with the fixing heads 3014 by adopting bearings or in a hinged manner, so that the wheel rods 3012 may rotate relative to the fixing heads 3014.

As shown in FIG. 2 and FIG. 3, the several connecting holes 3013 in the connecting rods 3011 are further used for connecting the cover plate 102. The cover plate 102 is fixed after the connecting pieces such as the screws or cotters penetrate through the connecting holes 3013. When doing reciprocating motion, the output shaft of the upper hydraulic machine 8 drives the connecting rods 3011 to move up and down along the guide rods 302 and also drives the fabric belt 4 tensioned on the wheel rods 3012 to downwards press or uplift.

As shown in FIG. 5, FIG. 9, FIG. 10 and FIG. 11, several fixed seats 7021 protruding out of the surface of the bottom plate 702 are disposed in the middle of the bottom plate 702, the fixed seats 7021 are used for determining the position of a support frame 11, and the support frame 11 includes a rectangular supporting plate 1101 and first supporting rods 1102 located on four vertices of the supporting plate 1101. One end of each of the first supporting rods 1102 is fixedly connected to the fixed seats 7021 by using screws, and the other ends of the first supporting rods 1102 are fixedly connected to the supporting plate 1101 by using screws, so that the first supporting rods 1102 and the supporting plate 1101 further form a cubic space. A lower hydraulic machine 9 is disposed in such a cubic space and is fixed to the bottom plate 702, and an output shaft penetrates through the supporting plate 1101.

Figure 9:
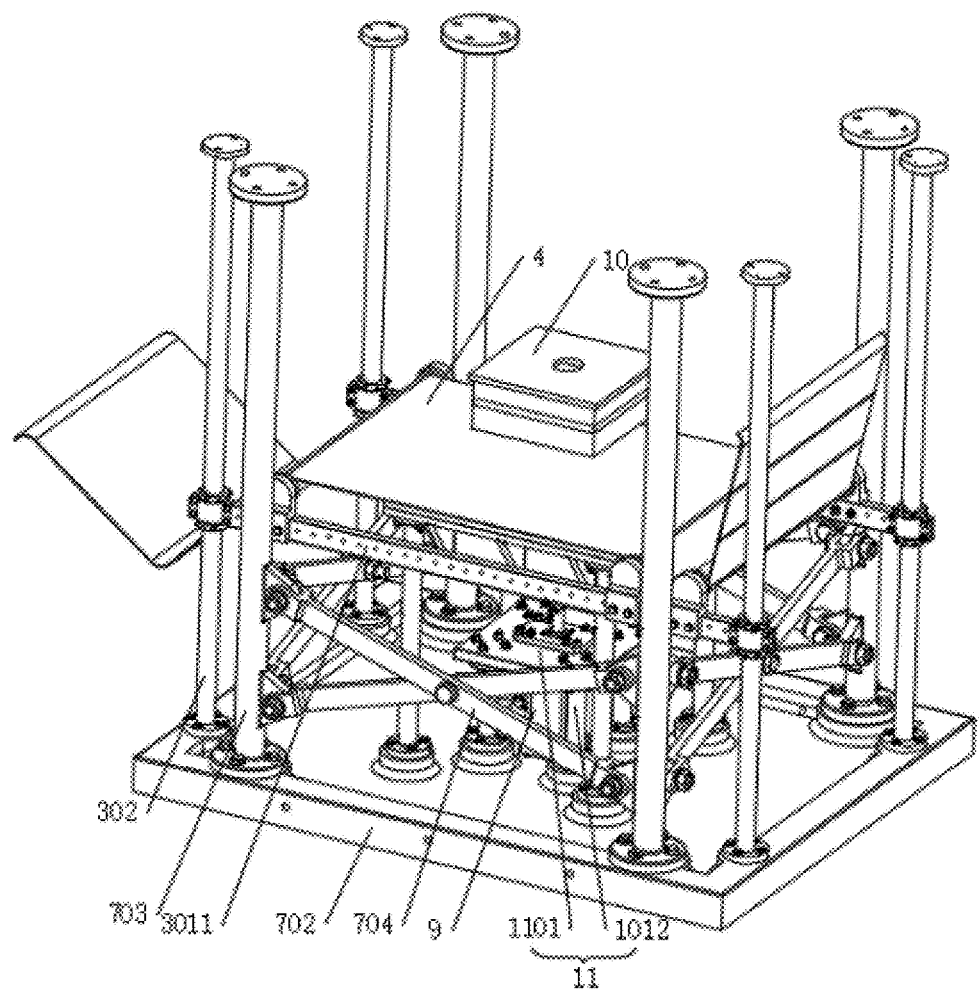
FIG. 9 shows a schematic structural diagram for embodying a position of a lower hydraulic machine in accordance with the present disclosure.
Figure 10:
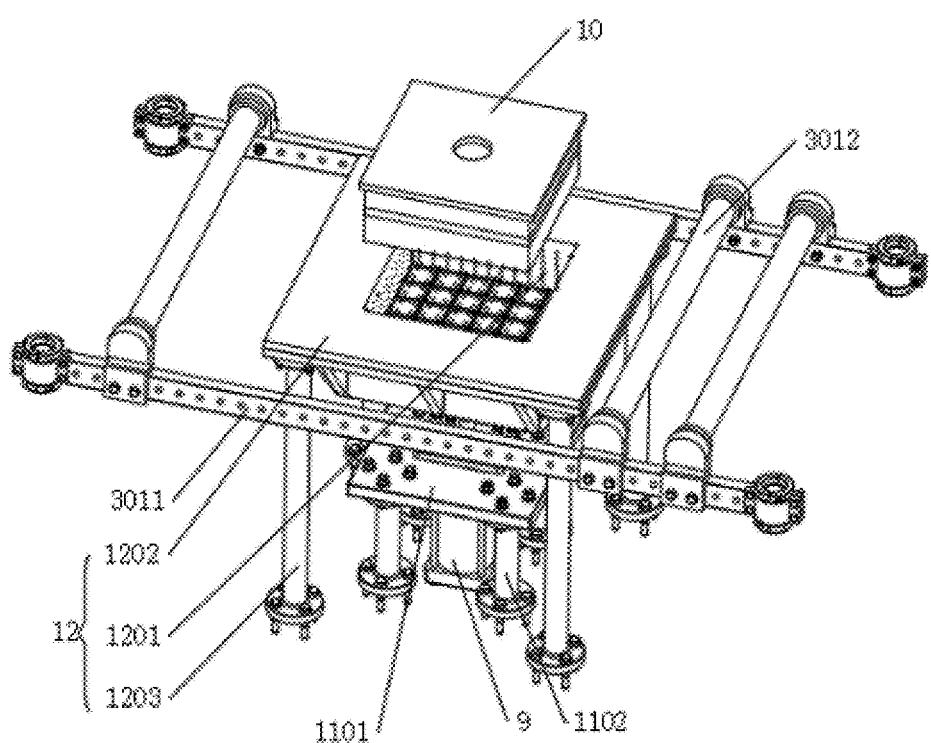
FIG. 10 shows a schematic structural diagram for embodying a die holder in accordance with the present disclosure.
Figure 11:
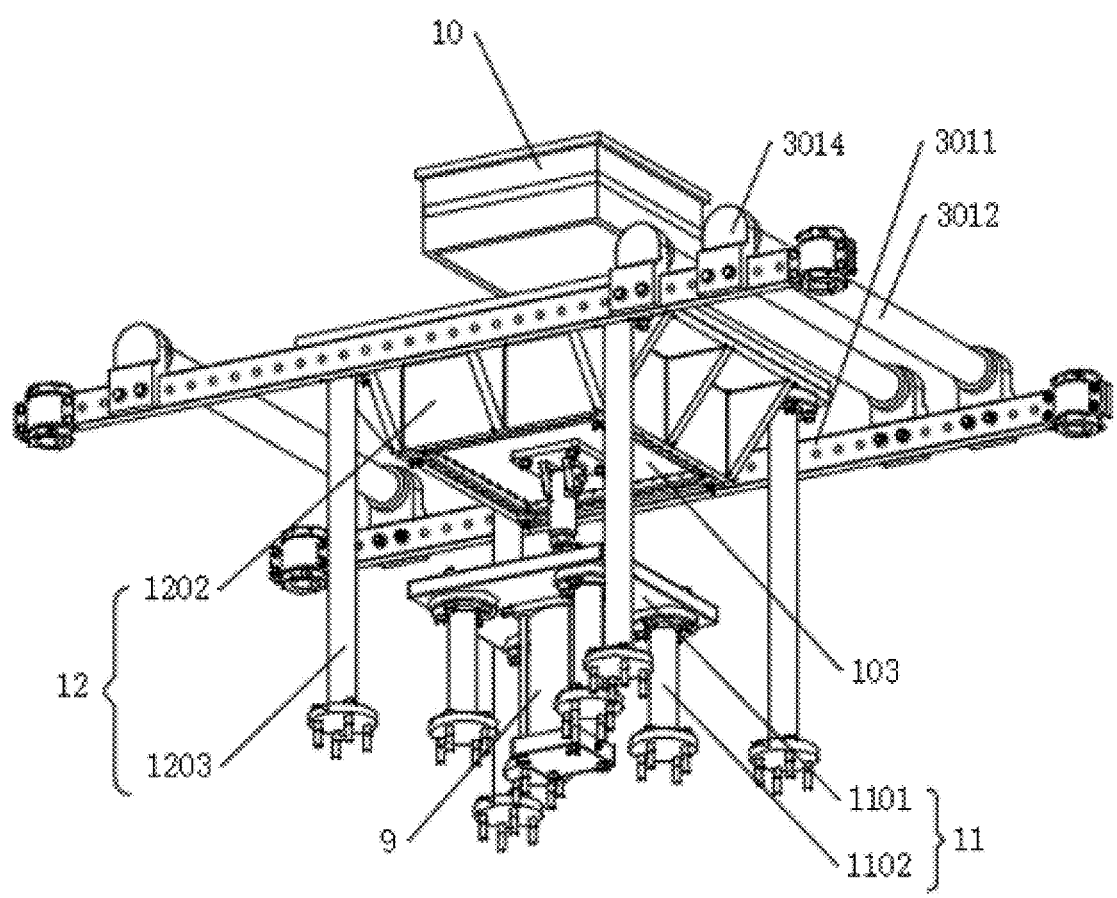
FIG. 11 shows a bottom structural view for embodying the die holder in accordance with the present disclosure.

As shown in FIG. 5. FIG. 9. FIG. 10 and FIG. 11, there are eight fixed seats 7021 in total on the bottom plate 702, they respectively fall on two rectangular vertex angle positions which are concentrically disposed, the relatively small rectangle is a position for mounting the support frame 11 of the lower hydraulic machine 9, the relatively large rectangle is a position for mounting a die cavity 101, that is, there is still a die holder 12 outside the support frame 11.

As shown in FIG. 5. FIG. 9, FIG. 10 and FIG. 11, in an area where the die cavity 101 is mounted, four second supporting rods 1203 are connected to the bottom plate 702 by using screws, an outer side cover 1202 is mounted on the tops of the second supporting rods 1203, top ends of the four second supporting rods 1203 respectively fall on four vertices of the outer side cover 1202, an inner side cover 1201 is disposed in the outer side cover 1202, and the inner side cover and the outer side cover form side walls of the die cavity 101. The second supporting rods 1203, the inner side cover 1201 and the outer side cover 1202 form the die holder 12.

As shown in FIG. 9 and FIG. 11, the end of the output shaft of the lower hydraulic machine 9 is connected with a jacking plate 103 which is disposed horizontally, an initial position of the jacking plate 103 falls on the bottom plate 702 in an area formed by the inner side cover and the outer side cover 1202, and the jacking plate 103 forms an accommodating cavity for accommodating soybean milk together with the inner side cover and the outer side cover. As shown in FIG. 2, a joint surface of the die cavity 101 formed by the inner side cover 1201 and the outer side cover 1202 is equipped with a fabric for demolding flavored dried bean curd. In the present embodiment, the fabric is a rotary fabric belt 4 driven by an intermittent fabric operation apparatus.

The intermittent fabric operation apparatus includes the following structure:

As shown in FIG. 2 and FIG. 3, a roller set 2 is divided into several driven rollers 201 and at least one intermittently rotating driving roller 202. In the present embodiment, at least one driving roller 202 is provided, and the driving rollers 202 are intermittently driven by a motor so as to intermittently move; when the driving rollers 202 move, the fabric belt 4 is driven; and when the driving rollers 202 stop, the device is in a process of pressing the white body of the flavored dried bean curd. The roller set 2 is disposed on a rack 6 which is a vertical plate body and is at least provided with two vertical guide rails 601, and one of the driving rollers 202 or driven rollers 201 falls into the guide rails 601 to slide back and forth. In view of the requirement that the driving rollers 202 are driven by the motor, in the present embodiment, relative positions of the driving rollers 202 and the rack 6 are constant, and the driven rollers 201 move along the guide rails 601. The guide rails 601, the driving rollers 202 and the driven rollers 201 are located on the same rack 6, and the rack 6 is further provided with a vertical guide rail 601 for mounting limiting rollers 503 of a cleaning mechanism 5 in addition to the guide rail 601 where the driven rollers 201 are located. At least three limiting rollers 503 are provided, wherein at least one limiting roller moving along the guide rail 601 is provided, and the limiting rollers 503 may descend to a limiting position to drive the fabric belt 4 to be immersed into a cleaning solution of a cleaning pool 501.

As shown in FIG. 2 and FIG. 3, the cleaning mechanism 5 includes the cleaning pool 501 located on the ground, an ultrasonic generator 502 is attached to the inner and outer side walls of the cleaning pool 501, and the fabric belt 4 passes by the cleaning pool 501 when circularly rotating. The cleaning mechanism 5 further includes several limiting rollers 503, and at least one of the limiting rollers 503 is immersed into a liquid in the cleaning pool 501.

As shown in FIG. 2 and FIG. 4, at least two sets of wrapping mechanisms 3 are provided. In the present embodiment, two sets of wrapping mechanisms 3 are adopted and are respectively disposed on the upper and lower sides of a joint surface of a die-pressing apparatus 1, and the fabric belt 4 disposed to be rotary is tensioned on the roller set 2 and the wheel rods 3012 of the wrapping mechanisms 3 to circularly rotate. Each set of wrapping mechanism 3 includes at least two connecting rods 3011 slidably connected with the guide rods 302, the wheel rods 3012 are connected between the connecting rods 3011, and the same set of connecting rods 3011 and the wheel rods 3012 are disposed on the same plane. Each set of wrapping mechanism 3 is tensioned with a segment of fabric belt 4, the added soybean milk is located between two segments of fabric belt 4, and the two segments of fabric belt 4 wrap the soybean milk to fall into the die cavity 101. When relatively moving, the two sets of wrapping mechanisms 3 drive the wrapped soybean milk to gradually fall into the die cavity 101. The set of wrapping mechanism having a larger vertical height slides up and down along the guide rods 302 of the frame body 7, the sliding power is from a hydraulic apparatus on the top of the frame body 7, and the cover plate 102 pushed by the hydraulic apparatus is fixedly connected with the connecting rods 3011 of the set of wrapping mechanism 3 to drive the connecting rods 3011 to move up and down, thereby pushing the fabric belt 4 to be close to or away from the soybean milk.

The above-mentioned die-pressing production device for the flavored dried bean curd is applied in a production method for a white body of flavored dried bean curd in accordance with the present embodiment. The production method includes the following steps.

Firstly, preparatory work:

a rotary fabric belt 4 is tensioned on a roller set 2 and wrapping mechanisms 3, the fabric belt 4 is firstly wound in an "S" shape on two wheel rods 3012 by taking the wheel rods 3012 located above a die cavity 101 as starting points and is in contact with another wheel rod 3012 after passing by the downside of a cover plate 102, at the moment, the fabric belt 4 pulled open between the two wheel rods 3012 located on two sides of the cover plate 102 is in a horizontal state; the fabric belt 4 is then led out of a frame body 7 and is introduced to the roller set 2, and in the roller set 2, the fabric belt 4 always bypasses two adjacent rollers in the "S" shape, and one segment of the fabric belt 4 is soaked into a cleaning pool 501. Then, the fabric belt 4 led out of the roller set 2 passes by the set of wrapping mechanism 3 having a smaller vertical height, and the winding manner of the fabric belt 4 on such a wrapping mechanism 3 and the winding manner of the wrapping mechanism 3 having the larger vertical height are oppositely disposed like that in a mirror.

After being led out of the set of wrapping mechanism 3 having the smaller vertical height, the fabric belt 4 returns to the set of higher wrapping mechanism 3 to form a closed loop.

Secondly, specific production process:

a feeding box 10 is disposed between the two sets of wrapping mechanisms 3, and the feeding box 10 is downwards pressed to drive the fabric belt 4 on the lower wrapping mechanism 3 to be pressed into the die cavity 101 together, soybean milk is poured into the feeding box 10, and then, the feeding box 10 is gradually withdrawn, at the moment, the soybean milk is wrapped by the fabric belt 4 so as to be located into the die cavity 101.

An upper hydraulic machine 8 pushes a cover plate 102 to gradually and downwards press, at the moment, driving rollers 202 or driven rollers 201 located in guide rails 601 uplift along the guide rails 601, so that the fabric belt 4 which is long enough may be driven by the higher wrapping mechanism 3 to downwards press until a die is closed; after the die is closed, a lower hydraulic machine 9 drives a jacking plate 103 to upwards jack to squeeze the soybean milk to form a white body of the flavored dried bean curd; and then, the die is opened, at the moment, the driving rollers 202 or driven rollers 201 located in the guide rails 601 are downwards pressed along the guide rails 601 to wind the excessive fabric belt 4, and thus, the fabric belt 4 is kept in a tensioned state.

Thirdly, discharging:

after the pressing is completed and the die is opened, the cover plate 102 upwards moves to reserve a space for discharge; and the jacking plate 103 upwards moves to jack out the white body of the flavored dried bean curd.

Fourthly, initial position resetting:

the lower hydraulic machine 9 drives the jacking plate 103 to return to an initial position; after each batch of flavored dried bean curd is produced, limiting rollers 503 immersed into a cleaning pool 501 are uplifted, and the fabric belt 4 is taken out from the cleaning pool 501;

wherein during production in the first, second and third steps, the fabric belt 4 is intermittently and circularly driven for one cycle under the action of the roller set 2 every time when a batch of flavored dried bean curd is produced, and an intermittent time period corresponds to a time period that the flavored dried bean curd is pressed.

Fifthly, the production processes of the flavored dried bean curd in the second, third and fourth steps are repeated.

Sixthly, the cleaning pool 501 is regularly removed, and a cleaning solution is replaced.

In the present solution, a manner that the fabric belt 4 is circularly wound is adopted, so that it is necessary to manually replace a fabric for the white body of each piece of flavored dried bean curd; moreover, during actual processing, the length of the fabric belt 4 on a die-pressing pan can be controlled by adjusting the roller set 2, so that the fabric belt 4 is always in a normal working state, that is, it is tensioned and is not overlong or shortened. Therefore, automatic, continuous and efficient production is achieved.

The above descriptions are intended to explain the present disclosure, rather than to limit the present disclosure. The scope defined by the present disclosure refers to the claims, and modifications in any forms may be made within the protection scope of the present disclosure.

What is claimed is:

1. A die-pressing production device for favored dried bean curd, comprising a die-pressing apparatus (1) and an intermittent fabric operation apparatus located a side of the die-pressing apparatus (1);

wherein the die-pressing apparatus (1) comprises a frame body (7), two parallel wrapping mechanisms (3) for wrapping a to-be-pressed material are disposed on the frame, a cover plate (102) for downwards pressing the wrapping mechanisms (3) is disposed on a top of the frame body (7), and a packing plate (103) for upwards jacking the wrapping mechanisms (3) is disposed on a bottom of the frame body (7); and the intermittent fabric operation apparatus comprises a rack (5), a rotary fabric belt (4), and a roller set (2) disposed on the rack (6), the roller set (2) is wound with the rotary fabric belt (4), and the rotary fabric belt is configured to pass through a space between the two wrapping mechanisms (3).

2. The die-pressing production device for the flavored dried bean curd of claim 1, wherein the frame body (7) comprises a top plate (701) and a bottom plate (702), upright posts (703) and guide rods (302) are connected between the top plate (701) and the bottom plate (702), and the wrapping mechanisms (3) are connected with the guide rods (302).

3. The die-pressing production device for the flavored dried bean curd of claim 2, wherein the wrapping mechanisms (3) comprise connecting rods (3011) slidably connected with the upright posts (703), wheel rods (3012) used for tensioning the fabric belt (4) is connected between the two connecting rods (3011), and the connecting rods (3011) and the wheel rods (3012) are disposed on the same plane.

4. The die-pressing production device for the flavored dried bean curd of claim 3, wherein fixing heads (3014) connected with the connecting rods (3011) are disposed on two ends of the wheel rods (3012), and the wheel rods (3012) rotate relative to the fixing heads (3014).

5. The die-pressing production device for the flavored dried bean curd of claim 2, wherein the top plate (701) is provided with an upper hydraulic machine (8), an end of an output shaft of the upper hydraulic machine (8) penetrates through the top plate (701) and is connected with the cover plate (102), and the cover plate (102) is connected with the connecting rods (3011).

6. The die-pressing production device for the flavored dried bean curd of claim 2, wherein the bottom plate (702) is provided with a lower hydraulic machine (9), an end of an output shaft of the lower hydraulic machine (9) is provided with the jacking plate (103), and the jacking plate (103) is located below the fabric belt (4).

7. The die-pressing production device for the flavored dried bean curd of claim 6, wherein the bottom plate (702) is further provided with second supporting rods (1203), a die cavity (101) is connected to the tops of the second supporting rods (1203), the die cavity (101) comprises an outer side cover (1202) connected with the second supporting rods (1203) and an inner side cover (1201) placed in the outer side cover (1202), and a motion path of the jacking plate (103) is located in the die cavity (101).

8. The die-pressing production device for the flavored dried bean curd of claim 1, wherein the roller set (2) comprises driving rollers (202) and driven rollers (201), the driven rollers are driven by the fabric belt (4), the rack (6) is further provided with guide rails (601), and the driving rollers (202) or the driven rollers (201) are slidably connected to the guide rails (601).

9. The die-pressing production device for the flavored dried bean curd of claim 1, wherein a cleaning pool (501) is disposed on a bottom of the rack (6), the fabric belt (4) passes through the cleaning pool (501) and is soaked into the cleaning pool (501), and an ultrasonic generator (502) is disposed on a side wall of the cleaning pool (501).

\* \* \* \* \*